April 29, 1941.  H. NUTT ET AL  2,240,346
FRICTION CLUTCH
Filed Feb. 23, 1938  2 Sheets-Sheet 1

Inventors:
Harold Nutt and
Harold V. Reed
By Edward C Fitzhugh
Atty.

April 29, 1941.  H. NUTT ET AL  2,240,346
FRICTION CLUTCH
Filed Feb. 23, 1938   2 Sheets-Sheet 2
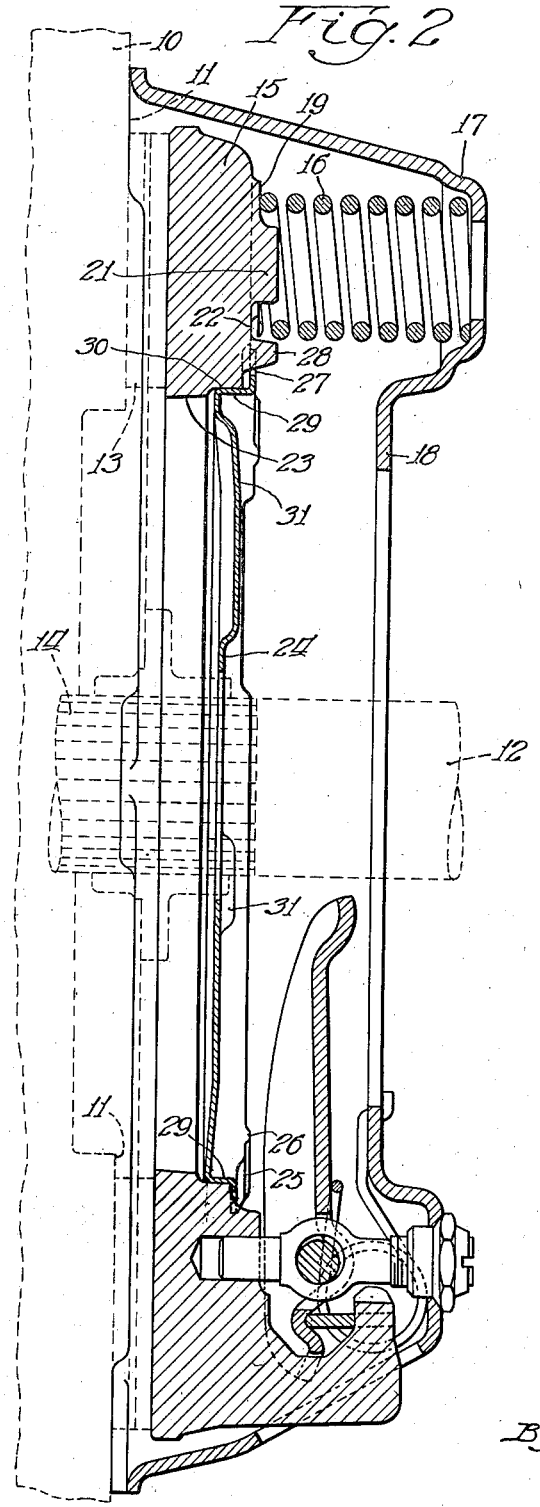
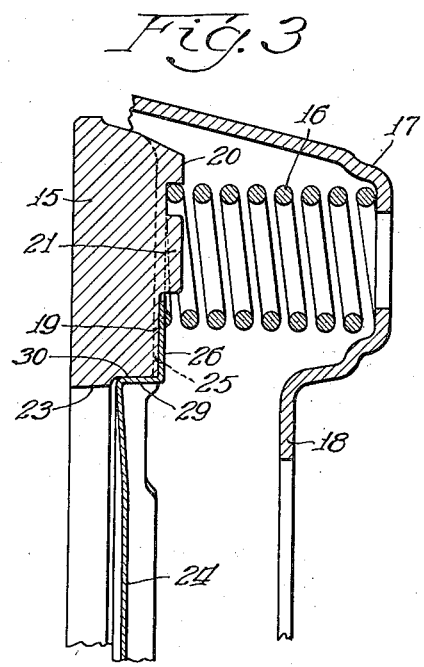
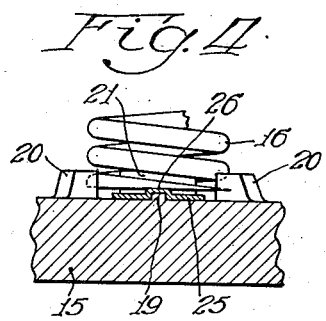
Inventors:
Harold Nutt and
Harold V. Reed
By: Edward C. Fitzhaugh
Atty.

Patented Apr. 29, 1941

2,240,346

UNITED STATES PATENT OFFICE 2,240,346

FRICTION CLUTCH

Harold Nutt and Harold V. Reed, Chicago, Ill., assignors to Borg-Warner Corporation, Chicago, Ill., a corporation of Illinois Application February 23, 1938, Serial No. 191,987

9 Claims. (Cl. 192—68)

Our invention relates to friction clutches and has particular reference to shields or baffle plates for intercepting oil or other foreign matter splashed, thrown, or working along the transmission shaft from the transmission of a motor vehicle, or otherwise moving toward the space between the pressure plate and flywheel of a clutch, so as to prevent such oil or foreign matter from reaching the friction clutch facing of the clutch driven member.

The primary object of our invention is to provide a baffle plate for this purpose, which may be installed in a conventional clutch with a maximum of ease and in a minimum period of time.

Another object of our invention is to provide such a baffle plate which is of extremely simple, durable and inexpensive construction.

A further object of the invention is to provide a baffle plate of this kind which may be attached to a conventional clutch without the use of securing elements of any kind other than the elements already present in the clutch itself.

The invention further contemplates simple, but effective means integral with the baffle plate, for piloting the same with respect to the pressure plate of the clutch. In one aspect of the invention, the piloting means may be integral with the means for attaching the baffle plate to the clutch.

Other objects, the advantages and uses of the invention will become apparent after reading the following specification and claims, and after consideration of the drawings forming a part of the specification, wherein:

Fig. 2 is a vertical section view of the same taken on the line 2—2 of Fig. 1;

Fig. 3 is a radial sectional view thereof taken on the line 3—3 of Fig. 1;

Fig. 4 is a sectional view taken on the line 4—4 of Fig. 1; and

Figure 1:
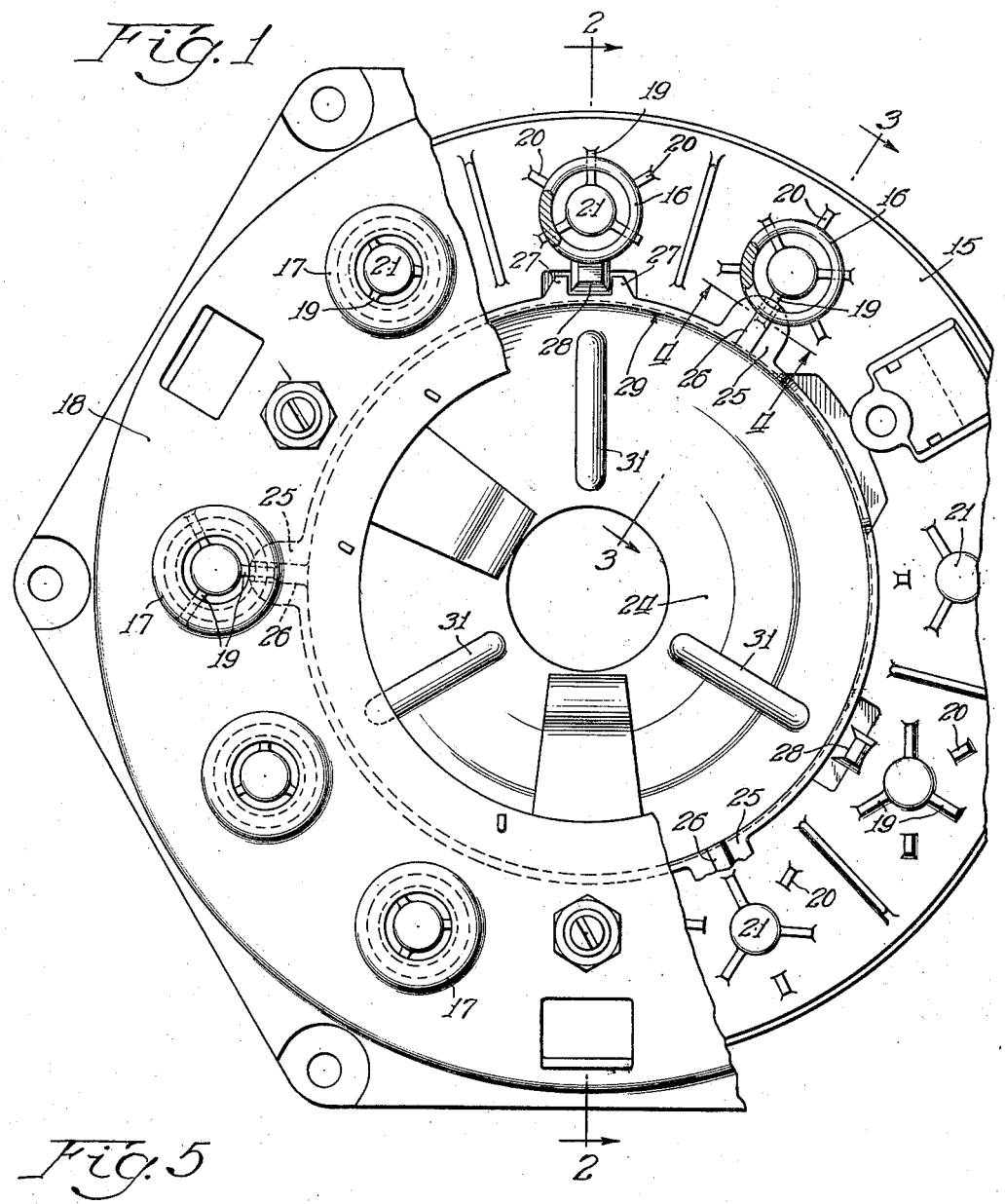
Fig. 1 is a rear elevation of a clutch embodying the invention, parts being broken away to better illustrate the novel features thereof.

The clutch which has been selected for purposes of illustration, is of the type illustrated in our prior U. S. Patent No. 2,062,101, including a flywheel 10 having a clutch face 11, a transmission shaft 12, and a clutch disc assembly or driven member, indicated generally at 13, secured upon the splined end 14 of the transmission shaft 12.

A pressure plate 15 is adapted to be urged against the driven member 13 by a plurality of pressure springs 16 so as to clamp the driven member 13 between the pressure plate and the flywheel clutch face 11 in a well known manner.

One end of each spring 16 is engaged in a cup-shaped depression 17 in a cover plate 18 which is attached to the flywheel 10. The other end of each spring 16 is engaged against a series of radially arranged lugs 19 formed on the rearward face of the pressure plate 15, and positioned between a series of lugs 20 also formed integrally with the rear face of the pressure plate, the lugs 20 projecting rearwardly beyond the faces of the lugs 19 so as to receive between them a turn of the spring 16. A central lug 21, around which both series of lugs 19 and 20 are coaxially arranged, projects into the end of the spring 16, forming with the lugs 20 a series of notches 22 in which the end turn of the spring is received.

The pressure plate 15 is conventionally in the form of a ring having a central opening 23 through which the shaft 14 extends, the opening 23 being much larger in diameter than the shaft 14, so that there exists in the conventional clutch construction an annular space through which oil from the transmission may at times reach the driven member 13.

For the purpose of intercepting any oil which may be thrown from the transmission into the opening 23, or may travel along the shaft 12 into said opening, we provide a baffle plate 24 having a diameter approximately the same as the internal diameter of the opening 23, although preferably slightly larger, as shown, and having a series of ears 25, projecting radially outwardly from its periphery and receivable between the springs 16 and one of each of the series of lugs 19.

Each ear 25 is provided with an embossed radially extending channel 26 adapted to receive the lug 19, as shown in Fig. 4, whereby the ears are secured against escaping circumferentially from their proper positions between the springs 16 and lugs 19. A turn of each spring extending across the channel 26 and in contact therewith, provides the engagement between the spring and the ear for holding the baffle plates in place.

To assist in locating the baffle plates circumferentially so as to properly position the ears with respect to the lugs 19, a pair of spaced fingers 27 may be formed on the periphery of the baffle plate, and arranged to engage between them the slanting side of a lug 28 formed on the pressure plate 15, so that as the pressure of the springs 16 is brought to bear against the ears 25, urging the baffle plate toward the face of the pressure plate 15, any slight mis-register between the channels 26 and the lugs 19, which might not be detected by a careless workman installing the baffle plate, will be corrected by adjustment of the fingers 27 to the slanting sides of the lug 28 as the baffle plate moves into engagement with the pressure plate 15. Such mis-register might easily result in the baffle plate working loose if the plate did not have the rim-piloting feature hereinafter described. In fact, the chances that it would do so would be about even.

If desired, the channels 26 may be eliminated, the ears 25 formed perfectly flat, and the circumferential locating be accomplished solely by the fingers 27, while, on the other hand, if desired, the fingers 27 may be eliminated and the locating be accomplished solely by the channels 26.

Each ear 25 is made only long enough so that it will extend just beneath one side of the engaging turn of the spring 16. This construction, contrasted, for example, with one in which the ears would be co-extensive in area with the ends of the springs 16, has certain definite advantages, one of which is that it makes it easier to install the baffle plate, and another of which is that it reduces considerably the amount of metal necessary in forming the baffle plate.

In order to avoid any possible radial displacement of the baffle plate which might allow one of the ears 25 to escape from beneath its corresponding spring, the baffle plate is piloted within the opening 23 by means of an offset shouldered rim portion 29 formed in its peripheral region, said rim portion 29 snugly engaging a turned internal face 30 in the opening 23.

The baffle plate may be rigidified and strengthened by radially extending ribs 31 embossed in it.

Figure 5:
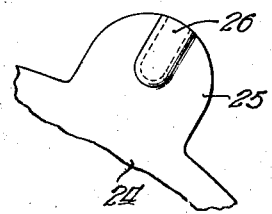
Fig. 5 is a detail view of a modification of the ear for attaching the baffle plate to the clutch.

It is not entirely essential that the offset rim portion 29 be employed for piloting the baffle plate. A satisfactory construction may be employed in which the offset region 29 is eliminated, and the piloting is accomplished by the channels 26. For example, the channels 26 may be made just long enough so that the ends of the channels will engage the ends of the lugs 19 to perform a radial piloting function. Such modification is shown in Fig. 5.

We claim:

1. In a friction clutch, in combination with an annular pressure plate formed with spring positioning lugs, a shaft extending axially therethrough and spaced therefrom by an annular opening, and circumferentially spaced springs positioned by said lugs and engaging said pressure plate for moving it in clutch engaging direction, a baffle plate covering said annular opening, said baffle plate having peripheral portions extending between the associated bearing portions of the springs and plates and being thereby engaged and supported, said peripheral portions extending only part way between said bearing portions so as to terminate short of said positioning lugs.

2. In a friction clutch, in combination with a driven member, a pressure plate formed with spring positioning lugs, circumferentially spaced springs positioned by said lugs and engaged against said pressure plate for moving it in clutch engaging direction, a baffle plate arranged to intercept oil or foreign matter moving in the direction of said driven member, said baffle plate having on its periphery radially extending ears extending between the associated bearing portions of the springs and plates and being thereby engaged and supported, said peripheral portions extending only part way between said bearing portions so as to terminate short of said positioning lugs.

3. In a friction clutch, in combination with an annular pressure plate having circumferentially spaced spring engaging lugs and springs engaged against said lugs for moving the pressure plate in clutch engaging direction, a baffle plate having peripheral regions formed with channels to partially receive said lugs and engaged between said springs and said plate whereby said baffle plate is located and supported in fixed relation to said pressure plate.

4. In a friction clutch, in combination with a shaft, an annular pressure plate having a central opening of much larger diameter than said shaft through which the shaft extends and having circumferentially spaced spring engaging lugs, and springs engaged against said lugs for moving said pressure plate in clutch engaging direction, a baffle plate covering said opening so as to intercept oil or foreign matter moving toward said opening, said baffle plate having on its periphery radially extending ears indented to partially receive said lugs and engaged between said springs and said lugs so as to locate and support said baffle plate in fixed relation to said pressure plate.

5. In a friction clutch, in combination with a shaft, an annular pressure plate having a central opening of larger diameter than said shaft through which said shaft extends, forming of said opening an annular space, and having a plurality of circumferentially spaced lugs, and coil springs engaged under compression against said lugs so as to transmit pressure to said pressure plate for urging the same in clutch engaging direction, a baffle plate traversing said annular space, said baffle plate having a central opening to receive said shaft, a rim portion fitted against the inner edge region of said pressure plate, and a plurality of ears extending radially outwardly from the periphery of said rim portion, each of said ears being of such length as to be engaged between just one side of one end of a corresponding spring and a lug whereby said baffle plate is supported.

6. In a friction clutch, in combination with a shaft, an annular pressure plate having a central opening of larger diameter than said shaft through which said shaft extends, forming of said opening an annular space, and having a plurality of circumferentially spaced lugs, and coil springs engaged under compression against said lugs so as to transmit pressure to said pressure plate for urging the same in clutch engaging direction, a baffle plate traversing said annular space so as to intercept oil or foreign matter moving toward said opening, said baffle plate having a central opening to receive said shaft, a rim portion fitted against the inner edge region of said pressure plate, and a plurality of ears extending radially outwardly from the periphery of said rim portion, each of said ears being of such length as to be engaged between just one side of one end of a corresponding spring and lug and being formed for locating engagement with said lug, whereby said baffle plate is supported and located in fixed relation to said pressure plate.

7. In a friction clutch, in combination with an annular pressure plate having a lug with circumferentially tapering sides, a shaft extending axially therethrough and spaced therefrom by an annular opening, and circumferentially spaced springs engaging said pressure plate for moving it in clutch engaging direction, a baffle plate covering said annular opening, said baffle plate having peripheral portions extending only part way between the associated bearing portions of the springs and plates and being thereby engaged and supported, and spaced fingers formed on and projecting from the periphery of said plate, adapted to engage said tapering sides of said lug for circumferentially adjusting said plate to proper position with respect to said pressure plate.

8. In a friction clutch, in combination with a shaft, an annular pressure plate having a central opening of much larger diameter than said shaft through which the shaft extends and having circumferentially spaced spring engaging lugs, and a projecting member with circumferentially tapering sides, and springs engaged against said lugs for moving said pressure plate in clutch engaging direction, a baffle plate covering said openings so as to intercept oil or foreign matter moving toward said opening, said baffle plate having on its periphery radially extending ears indented to partially receive said lugs and engaged between said springs and said lugs so as to locate and support said baffle plate in fixed relation to said pressure plate, each of said ears being of such length as to be engaged between just one side of one end of a corresponding spring and lug and being formed for locating engagement with said lug, whereby said baffle plate is supported and located in fixed relation to said pressure plate, and spaced fingers formed on and projecting from the periphery of said plate, adapted to engage said tapering sides of said projecting member for circumferentially adjusting said plate to proper position with respect to said pressure plate.

9. In a friction clutch, in combination with a shaft, an annular pressure plate having a lug with tapering sides and having a central opening of larger diameter than said shaft through which said shaft extends so as to form an annular space, and springs engaged against said plate for moving the same in clutch engaging direction; a baffle plate traversing said annular space, said baffle plate having a peripheral rim portion fitted against the inner edge region of said pressure plate, a central opening receiving said shaft, and having means projecting radially outwardly from said rim portion and engaged between the ends of said springs and said pressure plate, whereby to support said baffle plate, and spaced fingers formed on and projecting from the periphery of said plate, adapted to engage said tapering sides of said lug for circumferentially adjusting said plate to proper position with respect to said pressure plate.

HAROLD NUTT.
HAROLD V. REED.